United States Patent [19]

Herold

[11] Patent Number: 4,931,533

[45] Date of Patent: Jun. 5, 1990

[54] FILAMENT-, FIBER- OR FILM-FORMING AROMATIC COPOLYAMIDE FROM AROMATIC DIAMINE MIXTURE

[75] Inventor: Friedrich Herold, Hofheim am Taunus, Fed. Rep. of Germany

[73] Assignee: Hoechst Aktiengesellschaft, Frankfurt, Fed. Rep. of Germany

[21] Appl. No.: 291,503

[22] Filed: Dec. 29, 1988

[30] Foreign Application Priority Data

Dec. 31, 1987 [DE] Fed. Rep. of Germany ....... 3744601

[51] Int. Cl.$^5$ .............................................. C08G 69/32
[52] U.S. Cl. ................................. 528/185; 428/474.4; 528/183; 528/340; 528/348
[58] Field of Search ................ 528/185, 183, 340, 348

[56] References Cited

U.S. PATENT DOCUMENTS

| | | | |
|---|---|---|---|
| 4,196,144 | 4/1980 | Darms | 528/185 |
| 4,221,903 | 9/1980 | Elfert et al. | 528/185 |
| 4,758,651 | 7/1988 | Sikkema | 528/185 |
| 4,847,354 | 7/1989 | Keil et al. | 528/185 |

*Primary Examiner*—Harold D. Anderson

[57] ABSTRACT

Filaments, fibers and films from aromatic copolyamides (polyaramids) of the dicarboxylic acid/diamine type of at least four aromatic monomeric compounds of A', B', C' and D' which each contain a group of the following formulae:

A: —CO—Ar—CO—
B: —NH—Ar$^1$—NH—
C: —NH—Ar$^2$—NH—
D: —NH—Ar$^3$—Z—Ar$^3$—NH— and processes for their preparation and possible applications. Filaments, fibers and films having a high elongation at break and a high initial modulus are obtained using easily accessible monomers and polyaramids synthesized therefrom which are highly soluble in organic solvents.

16 Claims, 1 Drawing Sheet

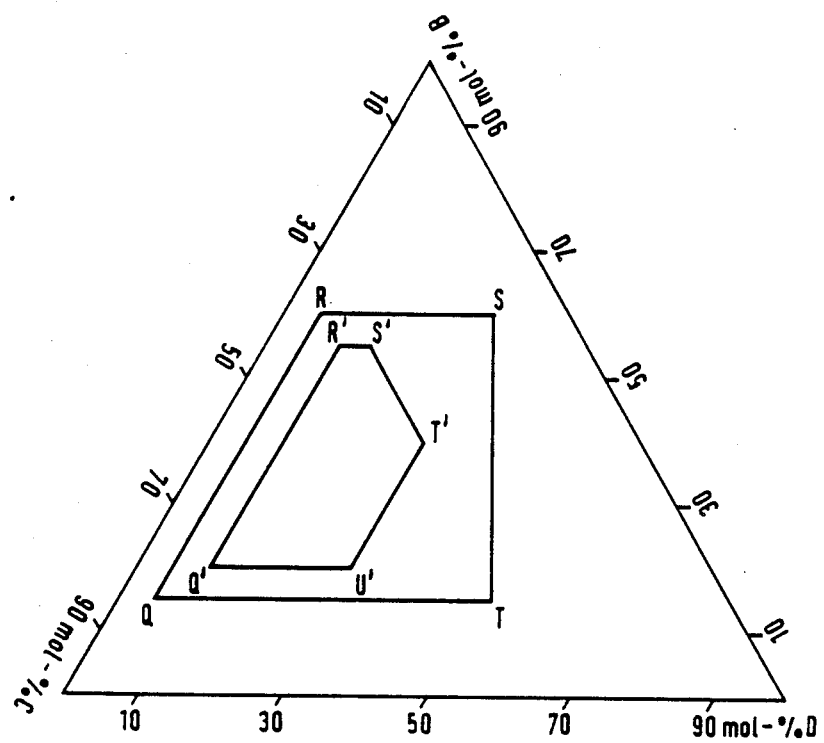

FILAMENT-, FIBER- OR FILM-FORMING AROMATIC COPOLYAMIDE FROM AROMATIC DIAMINE MIXTURE

DESCRIPTION

Filament-, fiber- or film-forming aromatic copolyamides, preparation and use thereof.

The present invention relates to filaments, fibers and films made of aromatic copolyamides (polyaramids) of the dicarboxylic acid/diamine type, processes for producing same and possible applications. More particularly, using this invention it is possible to obtain filaments, fibers and films having a high elongation at break and a high initial modulus using easily accessible monomers and polyaramids based thereon which are readily soluble in organic solvents.

Polyaramids are known for excellent thermal, chemical and mechanical properties.

Although it is true that filaments from predominantly p-linked homopolymers such as poly(p-phenyleneterephthalamide) (PPTA), obtained from p-phenylenediamine (PPD) and terephthaloyl dichloride (TPC), have very high mechanical properties, their low solubility in organic solvents makes it necessary to process them from concentrated sulfuric acid, i.e. in a two-stage process with a redissolving step (DE Pat. No. 2,219,703). However, this presents problems with respect to corrosion of machine parts; another disadvantage is the low elongation at break or transverse strength which complicates the textile processibility, for example into woven fabrics for reinforcing applications and/or leads to damage to the filaments.

A remedy is provided for example by copolymers based on PPTA and 3,4'-diaminodiphenyl ether (also known as 3,4'-oxydiphenylamine (3,4'-ODA)) or 1,4-bis(4'-aminophenoxy)benzene (BAPOB), the processibility in organic solvents being obtained by incorporation of flexible groups (EP-B-No. 0,045,934 and EP-No. 0,199,090). Although it is true that filaments from these copolymers have like PPTA very high mechanical properties, they still possess only a low elongation at break or transverse strength.

It is true that the switch to systems comprising m-phenylenediamine (MPD) and isophthaloyl chloride (IPC) leads to distinctly higher elongations at break and excellent solubility in organic solvents, but only at the cost of a distinct worsening of mechanical properties, in particular the initial modulus (U.S. Pat. No. 3,063,966).

DE Pat. No. 3,007,063 describes inter alia copolyamides based on TPC, IPC, PPD, MPD and/or 3,4'-ODA which all contain 3,4'-ODA or a structurally similar compound with other bridge members between the phenyl nuclei, which are processible into filaments from organic solvents and which have not only a high initial modulus but also high elongations at break. The disadvantage is that the 3,4'-substituted diamines such as 3,4'-ODA required for the preparation can only be prepared and purified in very expensive processes.

The present invention therefore has for its object to provide aromatic copolyamides which, from easily accessible monomers, can be prepared with good solubility in organic solvents and which permit the production of filaments, fibers and filaments having a high initial modulus and an elongation at break favorable for processing (not less than 5% in the case of drawn filaments) and the application thereof.

This object is achieved with aromatic copolyamides as defined in the claims. The shape-conferring structure of these copolyamides consists of the following recurring structural units:

A: —CO—Ar—CO— and also
B: —NH—Ar$^1$—NH—
C: —NH—Ar$^2$—NH—
D: —NH—Ar$^3$—Z—Ar$^3$—NH— where —Ar—, —Ar$^1$— and —Ar$^3$— are each a divalent aromatic radical of 6 to 12 carbon atoms where the bonds are in the p- or a comparable coaxial or parallel position and which may be substituted by one or two alkyl or alkoxy radicals of up to four carbon atoms, including branched ones, or halogen radicals, Ar$^2$— is a divalent aromatic radical where the bonds are in the m- or a comparable angled position and which may be substituted by one or two alkyl or alkoxy radicals up to four carbon atoms, including branched ones, or halogen radicals, —Z— is a grouping —O—Ar—O— where —Ar— is as defined above.

The amounts in which the diamines are used are not freely choosable but must be within specific mole percent ranges, based on the total number of moles of diamine components. The sole FIGURE of the accompanying drawing, which is incorporated in, and constitutes a part of, the specification graphically illustrates the specific mole percent ranges in which the diamine components must be present. This area is defined by the corner points Q, R, S and T, with the area defined by the corner points Q', R', S', T' and U' being particularly preferred; see the figure.

In the preparation of the aromatic copolyamides according to the invention, minor amounts of a fifth component E may be added, in which case the structure of the copolymers obtained can be not only stiffer but also more flexible than that of copolymers of structures A to D and there is a corresponding freedom for modeling the mechanical properties to a minor extent.

The Staudinger index [$\eta$] of the shape-forming copolyamides is within the range from 50 to 1000 cm$^3$/g, preferably 200 to 600 cm$^3$/g, measured in 96% strength $H_2SO_4$ at 25° C.

The production of filaments, fibers and films is effected in a conventional manner from solutions of these copolymers in organic solvents in the presence or absence of solubilizers.

According to the invention, filaments, fibers and films from these copolymers have not only the desired elongation at break, namely not less than 5% for drawn filaments, but also high initial moduli.

To prepare the copolyamides according to the invention, suitable compounds are those resited hereinafter.

Suitable dicarboxylic acid derivatives of the formula CL—CO—Ar—CO—Cl (A') are for example 4,4'-sulfonyldi(benzoyl chloride), 4,4'-oxydi(benzoyl chloride), 4,4'-biphenyldicarbonyl dichloride, 2,6-naphthalenedicarbonyl dichloride and substituted terephthaloyl dichlorides such as 2-chloroterephthaloyl dichloride.

Suitable aromatic diamines of the structure $H_2N$—Ar$^1$—NH$_2$ (B') are p-phenylenediamine and substituted p-phenylenediamines such as, for example, 2-chloro-, 2,5-dichloro- or 2-methoxy-p-phenylenediamine.

Suitable aromatic diamines of the structure $H_2N$—Ar$^2$—NH$_2$ (C') are m-phenylenediamine and substituted m-phenylenediamines such as, for example, 5-methoxy-m-phenylenediamine. Suitable diamine components of the structure $H_2N-Ar^3-Z-Ar^3-NH_2$ (D') are 1,4-bis(4'-aminophenoxy)benzene and substituted derivatives where $-Ar^3-$ is as defined above.

According to the invention, three diamine components are necessary for forming the copolyamide, as well as the dicarboxylic acid component, the amounts in which the diamines used not being freely choosable, but having to be within specific mole percent ranges, based on the total number of moles of diamine components.

The composition area required according to the invention for the copolymers is defined by the corner points specified below; the definition of the area is also depicted graphically in the figure in a triangular coordinate system. The corner points of the claimed area have the coordinates shown in the figure.

| Point | mol % of | | | Point | mol % of | | |
|-------|---|---|---|-------|---|---|---|
|       | B | C | D |       | B | C | D |
| Q | 15 | 80 | 5 | Q' | 20 | 70 | 10 |
| R | 60 | 35 | 5 | R' | 55 | 35 | 10 |
| S | 60 | 10 | 30 | S' | 55 | 30 | 15 |
| T | 15 | 32.5 | 52.5 | T' | 40 | 30 | 30 |
|   |    |    |    | U' | 20 | 50 | 30 |

Table 1: definition of the corner points of the claimed areas; cf. the FIGURE.

What is claimed is the area defined by the corner points Q, R, S and T, preferably the area defined by the corner points Q', R', S', T' and U'. The properties according to the invention rest on the incorporation of the amine building blocks B', C' and D' within the specified limits.

In the synthesis of the aromatic copolyamides thus defined, it is possible, according to the invention, for minor amounts, i.e. up to 25 mol-%, of a fifth structural unit E to be present. This component conforms to the formula (D') where, however, Z is a covalent bond and the amino group can also be an acid group. Depending on the structure, for example the mechanical properties of the copolymers obtained can once more be easily varied. Suitable fifth components are a large number of compounds, in general predominantly not only aromatic acid but also diamine derivatives. Highly suitable ones are for example 3,3'-dimethoxy-, 3,3'-dibutoxy-, 3,3'-dichloro- and 2,2'-dimethyl-benzidine, but preferably 3,3'-dimethylbenzidine.

The copolyamides according to the invention are prepared by copolymerization. Besides solution condensation, which is regarded as the most favorable method, it is also possible to employ other customary methods for preparing polyamides, for example melt, solid or interface condensation. The solution condensation of aromatic dicarbonyl dichlorides with mixtures of aromatic diamines takes place in aprotic polar solvents of the amide type, for example in N,N-dimethylacetamide or in particular in N-methyl-2-pyrrolidone. If necessary, these solvents may be admixed in a conventional manner with halide salts of the first and/or the second group of the periodic table in order to increase the solvency and/or to stabilize the polyamide solutions. Preferred additives are calcium chloride and/or lithium chloride. Customarily, the amount of dicarbonyl dichloride is chosen in such a way that the solution viscosity is maximized; that is, depending on the purity of the monomers, slightly more or less than 100 mol-% is added.

The polycondensation temperatures are customarily between $-20°$ and $+120°$ C., preferably between $+10°$ and $+100°$ C. Particularly good results are obtained with reaction temperatures between $+10°$ and $+80°$ C. The polycondensation reactions are preferably carried out in such a way that, after the reaction has ended, 2 to 30, preferably 3 to 20% by weight of polycondensate are present in the solution. For specific applications, the solution may if necessary be diluted with N-methyl-2-pyrrolidone or other amide solvents.

The polycondensation may be stopped in a conventional manner, for example by adding monofunctional compounds such as benzoyl chloride, but it is similarly possible to use monofunctional amines to limit the molecular weight.

After the polycondensation has ended, i.e. when the polymer solution has attained the viscosity required for further processing, the hydrogen chloride formed, which is bound loosely to the amide solvent, is neutralized by adding basic substances. Suitable for this purpose are for example lithium hydroxide, calcium hydroxide, but in particular calcium oxide. To produce shaped structures in accordance with the present invention, the above-described polyamide solutions according to the invention are filtered, devolatilized and further processed in a conventional manner such as described hereinafter.

The solutions may also be admixed with suitable amounts of additives. Examples are light stabilizers, anti-oxidants, antistats, dyes, colored pigments or fillers.

The copolyamides may also be isolated by suitable methods, for example distillation, precipitation or extraction, and then be admixed anew with solvents of the amide type, in the presence or absence of the above-described solvency-increasing additives. A shapable solution is then present ready for further processing. Preference, however, is given to the direct use of the condensation solution.

Shaped articles can be produced from the shapable solution by dry, wet or dry-wet methods or by spraying.

For example, in wet processes the spinning solution is conveyed through a spinning head having a plurality of spinning holes into a coagulation bath, where the solution solidifies to form filaments. In a variant of this process, the dry-wet process, the filaments first pass through an inert medium, preferably air or nitrogen, and only then enter the coagulation bath.

Pulp is formed for example by spraying the solutions into a suitable coagulation bath.

Films are formed by means of known processes such as casting or extruding. In the casting process, the filtered and devolatilized solution is applied in thin films to base materials. Suitable base materials are inert polymer films, for example of polyester, or metal tapes and in the laboratory even glass plates. Preference is given to processing the solutions at temperatures of at least about 10° C. below the boiling point of the solvent used, particularly preferably at least about 30° C. below the boiling point. In the case of excessively high temperatures there is a danger that the polymer will be damaged, while at excessively low temperatures the processing is complicated by the high viscosities. A favorable although not absolutely necessary measure is to predry the cast films, preferably down to a solvent content in the film between 5 and 90%. Suitable conditions are temperatures between room temperature and about 10° C. below the boiling point of the solvent used, together with strong convection such as prevails for example in through circulation cabinets. Depending on the temperature and convection, times between a few minutes and days, preferably between 2 and 30 minutes, are sufficient. The films are detachable from the base material immediately, during or directly after coagulation. As an alternative to casting, the filtered and devolatilized solutions may also be coagulated directly by means of suitable nozzles. This may be done wet or dry-wet, if the former by direct coagulation, if the latter by passing the preshaped film first through a zone of a non-coagulating medium, for example air. This zone can be between 5 and 400 mm, preferably between 10 and 100 mm.

The coagulation bath used can be water, an organic solvent or a mixture thereof, in each case if necessary with salt additions. Suitable salts are for example the above-resited halide salts of the first and second group of the periodic table. Preference is given to the salt which is also used as a solubilizer in the preparation of the condensation solution, particular preference being given to $CaCl_2$, in which case the concentration may be varied within wide limits. The temperature should be about 10° C. less than the boiling point of the coagulation bath, preferably between room temperature and 90° C.

The coagulated filaments and films are subsequently dewatered, for example by being passed over rollers through a plurality of successive wash baths. Ideally, all the salt must be washed off as a prerequisite for obtaining the properties according to the invention. Preference is given here to aqueous baths whose temperatures should in general be between room temperature and 90° C., preferably at up to 70° C. Customarily, a favorable arrangement comprises a plurality of baths in series and recirculation of the medium (countercurrent flow).

Drying is preferably effected over rollers or by means of IR radiators at temperatures between 100° and 500° C. A favorable although not absolutely necessary measure is the use of temperature gradients and/or their working under nitrogen. Particularly favorable processing is obtained with final temperatures of 200° to 400° C. which permit short drying times.

On films it is possible to obtain excellent dimensional stability of up to 400° C. by performing a heat treatment at temperatures between 200° and 500° C., preferably 300° to 400° C. A favorable measure here is to heat-treat the films under load; it is similarly possible to work under a nitrogen atmosphere. This loading force may be as high as the breaking strength of the film at the particular temperature, but preferable the film should not be loaded to more than 10% of this limiting value. In the production of drawn films no separate heat treatment is necessary.

Uniaxial or biaxial drawing, the latter being carried out in succession or simultaneously, may be effected using known techniques. Aside from drawing dry shaped articles over hot surfaces, under IR radiators or other heat sources, it is also possible to subject shaped articles containing a residual level of solvent and/or salt to wet drawing even in solvent baths. In the drawing of dry shaped articles the advantage is that high specific properties are obtained even at relatively low, minimum necessary temperatures of 200° C., preferably 250° C. Here too drawing may take place under a nitrogen atmosphere. It is also possible to employ combinations of wet and dry drawing. The draw ratios are within the range from 1.5-to 20-fold, preferably 2- to 10-fold (uniaxially). According to the invention, even relatively low draw ratios are sufficient for obtaining remarkably high mechanical properties.

The copolyamides according to the invention are very highly soluble in the above-described solvents of amide type. The polymers are further notable for excellent thermal, chemical, electrical and mechanical properties. A particularly advantageous aspect of the shaped product is the combination of high initial modulus and relatively high elongation at break. And the elongation at break can be increased almost linearly with the proportion of component C. Owing to this combination of properties, the solutions of the copolyamides are suitable for example for producing filaments, fibers, pulp, films, paper and other shaped articles.

Filaments, fibers or pulp from the copolyamide according to the invention can be used for example as reinforcing materials for rubber, thermoplastics or thermosetting resins or for producing filter fabrics or as a light-weight dampening material. Films and paper are suitable for use as a heat-resistant insulating material, films in particular for use as substrates for flexible circuit boards and for use in data processing.

The reported numerical values of the properties were determined by the following test methods:

Staudinger index $[\eta]$: The Staudinger index $[\eta]$ is defined by equation (1):

$$[\eta] = \lim_{c_2 \to 0} \frac{(\eta_L/\eta_1) - 1}{c_2} \tag{1}$$

where $\eta_L$ and $\eta_1$ are viscosities of the solution and the solvent respectively and $c_2$ is the concentration of the polymer.

Viscosity $\eta$: Viscosity $\eta$ was determined with a rotary viscometer (type RV 100, from Haake, Karlsruhe), the reported value being the value of the condensation solution at 90° C. extrapolated to a shear rate of zero.

Mechanical properties: The measurements were carried out with a tensile tester from Instron, by means of which the breaking strength, elongation at break, initial modulus (up to 0.5% extension), knot and loop strength were determined at 23° C. and 50% relative humidity, each quantity as an average of a plurality of measurements.

The films were tested in line with German Standard Specification DIN 53,455, Specimen 5 (strip width 15 mm, clamping length 50 mm and measurement rate 20 mm/min), filaments in line with German Standard Specification DIN 53,834 part 1.

Thermal measurements: The thermal data like melting and decomposition point are determined, unless otherwise stated, thermogravimetrically (TGA: $N_2$, 3 K/min) and by differential scanning calorimetry (DSC: $N_2$, 10 K/min).

EXAMPLES

The proportions of dicarboxylic acid components and diamine components were each calculated on the basis of 100 mol-%. The following abbreviations apply:

BAPOB 1,4-bis(4'-aminophenoxy)benzene
DMB 3,3'-dimethylbenzidine
MPD m-phenylenediamine
NMP N-methyl-2-pyrrolidone
PPD p-phenylenediamine
TPC terephthaloyl dichloride 1. Aromatic copolyamide consisting of 100 mol-% of TPC, 50 mol-% of PPD, 37.5 mol-% of MPD and 12.5 mol-% of BAPOB.

21.63 g of PPD, 16.22 of MPD and 14.62 g of BAPOB were dissolved in 1584 g of NMP under nitrogen ($N_2$), and 81.21 g of TPC were then added between 15° and 70° C. in the course of about 60 minutes. The viscous and clear solution was subsequently stirred at 70° C. for about 40 minutes, then neutralized with 24.54 g of CaO (96% strength, i.e. in 5% excess) and subsequently stirred at 70° C. for a further 30 minutes.

The solution contained 6.0% of copolyamide and 2.7% of $CaCl_2$; the dissolved copolyamide has a Staudinger index $[\eta]$ of 310 cm$^3$/g and a viscosity $\eta$ of 55 Pa.s at 90° C.

The solution was filtered, devolatilized and wet-spun. To this end it was spun at a speed of 16 m/min through a 50-hole nozzle, each hole 100 pm in diameter, into a coagulation bath comprising a 60° C. solution of 35% of NMP in water. The filaments obtained were pulled through a plurality of wash baths, a washer (about 20 wraps), over a drying godet and finally over a hot surface at 380° C. The imparted draw ratio was 1:3.5. The mechanical properties of the filaments are a breaking strength of 56 cN/tex, an elongation at break of 7% and an initial modulus of 20 N/tex.

The excellent solubility of the copolyamide is evident on determining $[\eta]$ from the very low Huggins constant $K_H$. The system of NMP with added LiCl (1%) gives a $K_H$ of 0.29±0.01, which corresponds to a thermodynamically very good solvent.

Thermogravimetric analysis of the thermal stability of the copolyamide at 5 K/min ($N_2$) does not show any weight loss until 460° C. Below this decomposition temperature, differential scanning calorimetry (DSC) at 20 K/min ($N_2$) after prior heat treatment at 250° C. shows that no melting takes place.

2. A solution conforming to the composition of Example 1 was filtered, devolatilized and cast into films. To this end it was spread out with a doctor blade at 90° C. on glass plates. The cast films were subsequently predried at 90° C. for 48 hours, then coagulated in water at 25° C., then watered for 20 minutes under running tap water and for 24 hours in demineralized $H_2O$ and thereafter dried at 110° C. and 50 mbar for 48 hours under a gentle stream of $N_2$.

The thickness of the films was adjustable between 2 and 100 μm, depending on the thickness of the solution left by the doctor blade.

The mechanical properties of an undrawn 25 μm thick film were a breaking strength of 169 MPa, an elongation at break of 124% and an initial modulus of 3.1 GPa.

3. A solution was prepared in the same way as in Example 1 from 32.44 g of PPD, 24.33 g of MPD, 21.93 g of BAPOB, 1722 g of NMP, 121.82 g of TPC and 36.80 g of CaO. The solution contained 8.0% of copolyamide and 3.6% of $CaCl_2$, the dissolved copolyamide having a Staudinger index $[\eta]$ of 345 cm$^3$/g and a viscosity $\eta$ of 460 Pa.s at 90° C.

This solution was processed in the manner of Example 1 through a 100-hole nozzle, each hole 100 μm in diameter, into filaments. Testing of the mechanical properties of the filaments showed them to have a breaking strength of 66 cN/tex, an elongation at break of 8% and an initial modulus of 23 n/tex. The knot and loop strengths were 49 and 52% respectively of the breaking strength.

EXAMPLES 4 TO 15 AND COMPARATIVE EXAMPLES C1 to C5

Examples 4 to 10 show that it is possible, by varying the composition of the copolyamide within the claimed areas, to substantially vary the mechanical properties and the solubility and to adapt them to any particular application.

Comparative Examples C1 to C5, indicated by the prefix C, are experiments outside the claimed area.

Examples 11 to 15 illustrate that it is possible to add minor amounts of a fifth diamine component E.

The filaments were produced in all cases as described in Example 1; the data obtained are summarized in Table 2. Specifically, Table 2 gives the composition of the copolymers, the concentration of polymer and $CaCl_2$, the Staudinger index $[\eta]$ and the viscosity $\eta$ at 90° C. and also the filament properties.

In Example 4, the knot and loop strengths are 58 and 66% respectively of the breaking strength.

Comparative Examples C2 and C3 each had to have added to them 30 g of LiCl in order to obtain a clear and homogeneous solution. These batches were only badly spinnable into filaments, if at all.

In each and every batch, 81.21 g of TPC (component A) and 24.54 g of CaO (96% strength, i.e. in 5% excess) were used.

TABLE 2

| | | B | | | C | | | D | | | E | |
|---|---|---|---|---|---|---|---|---|---|---|---|---|
| Example No. | Type | mol % | g | Type | mol % | g | Type | mol % | g | Type | mol % | g |
| V$_1$ | PPD | 62.5 | 27.04 | MPD | 25 | 10.81 | BAPOB | 12.5 | 14.62 | — | — | — |
| 4 | PPD | 37.5 | 16.22 | MPD | 50 | 21.63 | BAPOB | 12.5 | 14.62 | — | — | — |
| 5 | PPD | 25 | 10.81 | MPD | 62.5 | 27.04 | BAPOB | 12.5 | 14.62 | — | — | — |
| V$_2$* | PPD | 75 | 32.44 | MPD | 12.5 | 5.04 | BAPOB | 12.5 | 14.62 | — | — | — |
| 6 | PPD | 37.5 | 16.22 | MPD | 37.5 | 16.22 | BAPOB | 25 | 29.23 | — | — | — |
| 7 | PPD | 25 | 10.81 | MPD | 50 | 21.63 | BAPOB | 25 | 29.23 | — | — | — |
| 8 | PPD | 50 | 21.63 | MPD | 25 | 10.81 | BAPOB | 25 | 29.23 | — | — | — |
| V$_3$* | PPD | 62.5 | 27.04 | MPD | 12.5 | 5.41 | BAPOB | 25 | 29.23 | — | — | — |
| V$_4$ | PPD | 50 | 21.63 | MPD | 12.5 | 5.41 | BAPOB | 37.5 | 43.85 | — | — | — |
| 9 | PPD | 37.5 | 16.22 | MPD | 25 | 10.81 | BAPOB | 37.5 | 43.85 | — | — | — |
| 10 | PPD | 25 | 10.81 | MPD | 37.5 | 16.22 | BAPOB | 37.5 | 43.85 | — | — | — |
| V$_5$ | PPD | 25 | 10.81 | MPD | 25 | 10.81 | BAPOB | 50 | 58.47 | — | — | — |
| 11 | PPD | 45 | 19.47 | MPD | 33.75 | 14.60 | BAPOB | 11.25 | 13.16 | DMB | 10 | 8.49 |
| 12 | PPD | 40 | 17.30 | MPD | 30 | 12.98 | BAPOB | 10 | 11.69 | DMB | 20 | 16.98 |
| 13 | PPD | 33.75 | 14.60 | MPD | 45 | 19.47 | BAPOB | 11.25 | 13.16 | DMB | 10 | 8.49 |
| 14 | PPD | 30 | 12.98 | MPD | 40 | 17.30 | BAPOB | 10 | 11.69 | DMB | 20 | 16.98 |
| 15 | PPD | 20 | 8.65 | MPD | 50 | 21.63 | BAPOB | 10 | 11.69 | DMB | 20 | 16.98 |

TABLE 2-continued

Part 2

| Example No. | NMP g | Concentration % Polymer | Concentration % CaCl$_2$ | Characterization $[\eta]/(cm^3/g)$ | Characterization $\eta/Pa \cdot s$ | Breaking Strength (cN/tex) | Filament Properties Elongation at (%) break | Filament Properties Initial Modulus (N/tex) |
|---|---|---|---|---|---|---|---|---|
| V$_1$ | 1583.7 | 6.0 | 2.7 | 300 | 45 | 40 | 4 | — |
| 4 | 1583.7 | 6.0 | 2.7 | 260 | 17 | 50 | 9 | — |
| 5 | 1583.7 | 6.0 | 2.7 | 250 | 10 | 40 | 12 | — |
| V$_2$* | 1583.7 | 5.2 | 2.2 | 205 | — | — | — | — |
| 6 | 1728.0 | 6.0 | 2.5 | 360 | 94 | — | — | — |
| 7 | 1728.0 | 6.0 | 2.5 | 235 | 11 | 25 | 11 | 7 |
| 8 | 1728.0 | 6.0 | 2.5 | 405 | 360 | 45 | 5 | 19 |
| V$_3$* | 1728.0 | 4.8 | 1.9 | 445 | 160 | — | — | — |
| V$_4$ | 1872.3 | 6.0 | 2.3 | 500 | 240 | 100 | 3 | — |
| 9 | 1872.3 | 6.0 | 2.3 | 490 | 285 | 35 | 5 | — |
| 10 | 1872.3 | 6.0 | 2.3 | 350 | 100 | — | — | — |
| V$_5$ | 2016.6 | 6.0 | 2.1 | 490 | 165 | 30 | 4 | — |
| 11 | 1634.5 | 6.0 | 2.6 | 382 | 66 | 49 | 5 | 22 |
| 12 | 1685.4 | 6.0 | 2.5 | 416 | 55 | 50 | 5 | 22 |
| 13 | 1634.5 | 6.0 | 2.6 | 369 | 43 | 28 | 6 | — |
| 14 | 1685.4 | 6.0 | 2.5 | 346 | 20 | 44 | 6 | 18 |
| 15 | 1685.4 | 6.0 | 2.5 | 277 | 5.9 | 30 | 7 | 13 |

*Addition of 30 g of LiCl

I claim:

1. A filament-, fiber- and film-forming aromatic copolyamide of the dicarboxylic acid/diamine type consisting essentially of the recurring structural units of formulae
   A: —CO—Ar—CO—
   B: —NH—A$^1$—NH—
   C: —NH—A$^2$—NH—
   D: —NH—Ar$^3$—Z—Ar$^3$—NH—
   wherein:
   —Ar—, —Ar$^1$— and —Ar$^3$— are each a divalent aromatic radical of 6 to 12 carbon atoms where the bonds are in the p-or a comparable coaxial or parallel position;
   —Ar$^2$—is a divalent aromatic radical where the bonds are in the m- or a comparable angled position;
   —Z— is a grouping —O—Ar—O where —Ar— is as defined above;
   and the composition of B, C and D, which are diamines, is within a mole percent area, based on the total number of moles of the diamines B, C and D, which is defined by corner points Q, R, S and T where:
   Point Q is 15 mol-% of B, 80 mol-% of C, 5 mol-% of D.
   Point R is 60 mol-% of B, 35 mol-% of C, 5 mol-% of D
   Point S is 60 mol-% of B, 10 mol-% of C, 30 mol-% of D
   Point T is 15 mol-% of B, 32.5 mol-% of C, 52.5 mol-% of D
   and having a Staudinger index [η] within the range from 50 to 1000 cm$^3$/g, measured in 96% strength H$_2$SO$_4$ at 25° C.

2. The copolyamide as claimed in claim 1, wherein the composition of the diamines is within the mole percent area, based on the total number of moles of the diamine components, which is formed by the corner point Q', R', S', T' and U', where:
   Point Q' is 20 mol-% of B, 70 mol-% of C, 10 mol-% of D
   Point R' is 55 mol-% of B, 35 mol-% of C, 10 mol-% of D
   Point S' is 55 mol-% of B, 30 mol-% of C, 15 mol-% of D
   Point T' is 40 mol-% of B, 30 mol-% of C, 30 mol-% of D
   Point U' is 20 mol-% of B, 50 mol-% of C, 30 mol-% of D 3. The copolyamide as claimed in claim 1, wherein there is additionally present a further diamine structural unit of the formula E: —NH—Ar$^3$—Z—Ar$^3$—NH— in amounts of up to 25 mol-%, where Z is a covalent bond.

4. The copolyamide as claimed in claim 1, wherein the radicals —Ar$^1$—, —Ar$^2$— and —Ar$^3$— are unsubstituted or substituted by one or two alkyl or alkoxy radicals, branched or unbranched, of up to 4 carbon atoms or halogen radicals.

5. The copolyamide as claimed in claim 1, wherein the Staudinger index ist within the range from 200 to 600 cm$^3$/g, measured at 96% strength H$_2$SO$_4$ at 25° C.

6. A process for preparing an aromatic copolyamide, comprising cocondensing of at least four aromatic monomeric compounds A', B', C' and D' which each respectively contains a group of the following formulae:
   A: —CO—Ar—CO—
   B: —NH—Ar$^1$—NH—
   C: —NH—Ar$^2$—NH—
   D: —NH—Ar$^3$—Z—Ar$^3$—NH—
   wherein:
   —Ar—, —Ar$^1$— and —Ar$^3$— are each a divalent aromatic radical of 6 to 12 carbon atoms where the bonds are in the p- or a comparable coaxial or parallel position,
   —Ar$^2$— is a divalent aromatic radical where the bonds are in the m- or a comparable angled position;
   —Z— is a grouping —O—Ar—O— where —Ar— is as defined above,
   wherein the molar proportions of the monomeric diamine compounds B' to D' are condensed in such amounts that the copolyamide resulting therefrom falls within a triangular diagram for the composition inside a manysided area formed by the corner points Q, R, S and T, where:
   Point Q is 15 mol-% of B, 80 mol-% of C, 5 mol-% of D
   Point R is 60 mol-% of B, 35 mol-% of C, 5 mol-% of D
   Point S is 60 mol-% of B, 10 mol-% of C, 30 mol-% of D
   Point T is 15 mol-% of B, 32.5 mol-% of C, 52.5 mol-% of D and a Staudinger index [η] is obtained within the range from 50 to 1000 cm$^3$/g measured in 96% strength H$_2$SO$_4$ at 25° C.

7. The process as claimed in claim 6, wherein a solution, melt, solid or interface condensation is carried out.

8. The process as claimed in claim 6, wherein the copolyamide is prepared via low-temperature solution methods in aprotic and polar organic solvents of the amide type in the presence or absence of metal halides of the first and second group of the period table as solubilizers and subsequent neutralization of the HCl formed by the addition of basic substances.

9. The process as claimed in claim 6, wherein the composition of the diamines is within the mole percent area, based on the total number of moles of the diamine components, which is formed by the corner points Q', R', S', T' and U', where:

Point Q' is 20 mol-% of B, 70 mol-% of C, 10 mol-% of D

Point R' is 55 mol-% of B, 35 mol-% of C, 10 mol-% of D

Point S' is 55 mol-% of B, 30 mol-% of C, 15 mol-% of D

Point T' is 30 mol-% of B, 30 mol-% of C, 30 mol-% of D

Point U' is 20 mol-% of B, 50 mol-% of C, 30 mol-% of D.

10. The process as claimed in claim 6, wherein there is additionally present a further diamine structural unit of the formula E: —NH—Ar$^3$—Z—Ar$^3$—NH— in amounts of up to 25 mol-%, where Z is a covalent bond.

11. The process as claimed in claim 6, wherein the radicals —Ar$^1$—, —Ar$^2$— and —Ar$^3$— are unsubstituted or substituted by one or two alkyl or alkoxy radicals, branched or unbranched, of up to 4 carbon atoms or halogen radicals.

12. The process as claimed in claim 6, wherein the Staudinger index is within the range from 200 to 600 cm$^3$/g, measured at 96% strength H$_2$SO$_4$ at 25° C.

13. Shaped article produced from the copolyamide as claimed in claim 1.

14. Shaped article as claimed in claim 13 in the form of filaments, fibres, pulp, films or paper.

15. Shaped article as claimed in claim 14 in the form of a reinforcing material for rubber, thermoplastics or thermosetting resins, a filter fabric or dampening material, a heat-resistant insulating material or a substrate for flexible circuit boards.

16. Shaped article as claimed in claim 14 in the form of a substrate for flexible circuit boards in data processing.

* * * * *

UNITED STATES PATENT AND TRADEMARK OFFICE
CERTIFICATE OF CORRECTION

PATENT NO. : 4,931,533

DATED : June 5, 1990

INVENTOR(S) : FRIEDRICH HEROLD

It is certified that error appears in the above-identified patent and that said Letters Patent is hereby corrected as shown below:

In Column 1, line 65, "filaments", second occurrence, should read -- films -- .

In Column 2, line 53, "resited" should read -- recited -- .

In Column 5, line 50, "preferable" should read -- preferably -- .

In Column 7, line 18, "100 pm" should read -- 100 μm -- .

In Claim 1, Column 9, line 29, "—NH—A$^1$—NH—" should read -- —NH—Ar$^1$—NH— -- .

In Claim 1, Column 9, line 30, "—NH—A$^2$—NH—" should read -- —NH—Ar$^2$—NH— -- .

In Claim 3, Column 10, line 26, "diaminc" should read -- diamine -- .

UNITED STATES PATENT AND TRADEMARK OFFICE
CERTIFICATE OF CORRECTION

PATENT NO. : 4,931,533

DATED : June 5, 1990

INVENTOR(S) : FRIEDRICH HEROLD

It is certified that error appears in the above-identified patent and that said Letters Patent is hereby corrected as shown below:

In Claim 5, Column 10, line 35, "ist" should read -- is -- .

In Claim 9, Column 11, line 26, "30 mol-% of B" should read -- 40 mol-% of B -- .

In Claim 10, Column 12, line 4, "diaminc" should read -- diamine -- .

Signed and Sealed this

Twenty-sixth Day of November, 1991

*Attest:*

HARRY F. MANBECK, JR.

*Attesting Officer*  *Commissioner of Patents and Trademarks*